United States Patent [19]

McLelland

[11] 3,824,900
[45] July 23, 1974

[54] MOVEMENT CONTROL APPARATUS
[76] Inventor: John Douglas McLelland, 36 St. George Rd., Swanley, England
[22] Filed: Nov. 3, 1972
[21] Appl. No.: 303,367

[30] Foreign Application Priority Data
Nov. 11, 1971 Great Britain.................... 52514/71

[52] U.S. Cl. .......................................... 92/8, 92/12
[51] Int. Cl. ........................................... F15b 15/22
[58] Field of Search ............ 92/8, 11, 12, 257, 258; 138/43

[56] References Cited
UNITED STATES PATENTS

| 1,957,829 | 5/1934 | Greenwald | 138/43 X |
| 1,958,398 | 5/1934 | Smith | 138/43 X |
| 2,014,819 | 9/1935 | Spicknall | 92/257 X |
| 2,620,046 | 12/1952 | Bonameau | 138/43 X |
| 2,624,318 | 1/1953 | Walder | 92/9 |
| 2,664,859 | 1/1954 | Green | 92/12 |
| 3,146,680 | 9/1954 | Hutter et al. | 92/111 X |
| 3,247,767 | 4/1966 | Aslan | 92/258 X |
| 3,678,805 | 7/1972 | Weyman | 92/11 |

Primary Examiner—Irwin C. Cohen
Attorney, Agent, or Firm—William Anthony Drucker

[57] ABSTRACT

The invention provides an apparatus for a tool slide at controlled speeds comprising a double-acting fluid operated piston and cylinder for advance and return, and fluid control means for controlling the speed of advance and return, said means including concentric tubes within the cylinder communicating with advance and return control valves located one behind the end of the cylinder remote from the tool slide.

7 Claims, 10 Drawing Figures

PATENTED JUL 23 1974 3,824,900

MOVEMENT CONTROL APPARATUS

This invention relates to apparatus for moving a member at controlled speeds. For example it is required to move the tool slide of a machine tool to effect rapid advance up to the work, a slow advance for cutting, and a return which may be rapid or first slow and then rapid.

It is known to provide a pneumatic piston and cylinder device for providing the driving power for advance and return and to connect the piston to the piston of an hydraulic piston and cylinder control device which controls the speeds of advance and return. The object of the present invention is to improve the construction of the apparatus especially the control device to facilitate manufacture and maintenance and to minimize the overall size of the apparatus.

According to the present invention the apparatus comprises a double-acting fluid operated piston and cylinder including a tubular piston rod which extends at its forward end out of the cylinder to actuate said member, a first valve block fixed to the end of cylinder remote from said extended end of the piston rod, a second valve block secured against the rear of the first valve block, two tubes disposed within the tubular piston rod, the two tubes being spaced apart from each other and from the tubular piston rod radially to provide three channels to contain liquid, the outer tube carrying an inner piston at its forward end sliding in the tubular piston rod, one of the inner two channels of which at the forward end communicates with the tubular piston rod in front of the inner piston therein and the other of which two inner channels communicates with the outer channel behind the inner piston, said valve blocks containing adjustable metering valves one for forward control and the other for return control, the outer of said two tubes being fixed in the first (front) valve block, while the inner tube continues through the first valve block into the second valve block to communicate with the metering valve in the second valve block while the outer of the inner two channels communicates with the control valve in the first valve block, whereby the speed of advance and withdrawal of the said member can be controlled.

The valve means may consist of a pair of metering valves used alternately for advance and return movements.

Thus the forces applied by the pneumatic pressure are co-axial with the resisting forces applied by hydraulically whereby twisting effects are avoided and a short and compact apparatus is provided.

The invention will now be described by way of example with reference to the accompanying diagrammatic drawings wherein.

Figure 1:
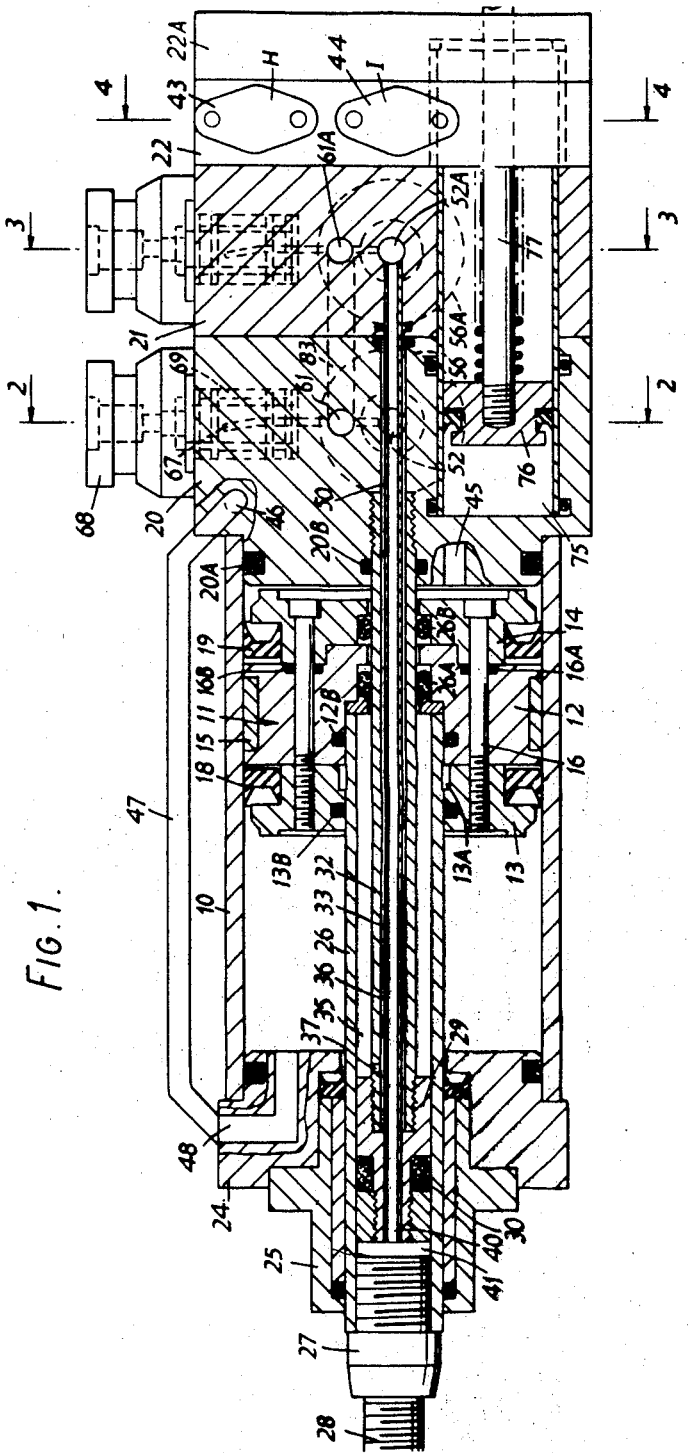
FIG. 1 is a section on a central vertical plane of a pneumatic-hydraulic apparatus made in accordance with the invention.

A cylinder 10 contains a piston 11. This piston and cylinder device is double-acting and operated by fluid e.g., pneumatic. The piston 11 is built up from a central section or annulus 12 and two sections in the form of annuli 13, 14 one on each side of the section 12. The three sections are held together by bolts 16 and the annuli contain seals or packing rings 18, 19 which slide in the cylinder 10. The central section has an exterior groove which contains a bush 15 made of synthetic plastics material e.g., nylon.

The annulus 13 seats on a split annular bush 13A which is seated in a groove in a tubular piston rod 26 and in an annular groove in the inner side of the annulus 13. Elastic sealing rings 13B, 12B surround the rod 26 on opposite sides of the bush 13A and are held in grooves in the annulus 13 and section 12 respectively. Elastic sealing rings 16A, 16B carried by the section also surround the bolts 16. By this construction the piston rod 26 can be rotated when attaching it to a tool without rotating the piston and therefore there is no tendency to undo any part of the piston assembly inadvertently.

Figure 3:
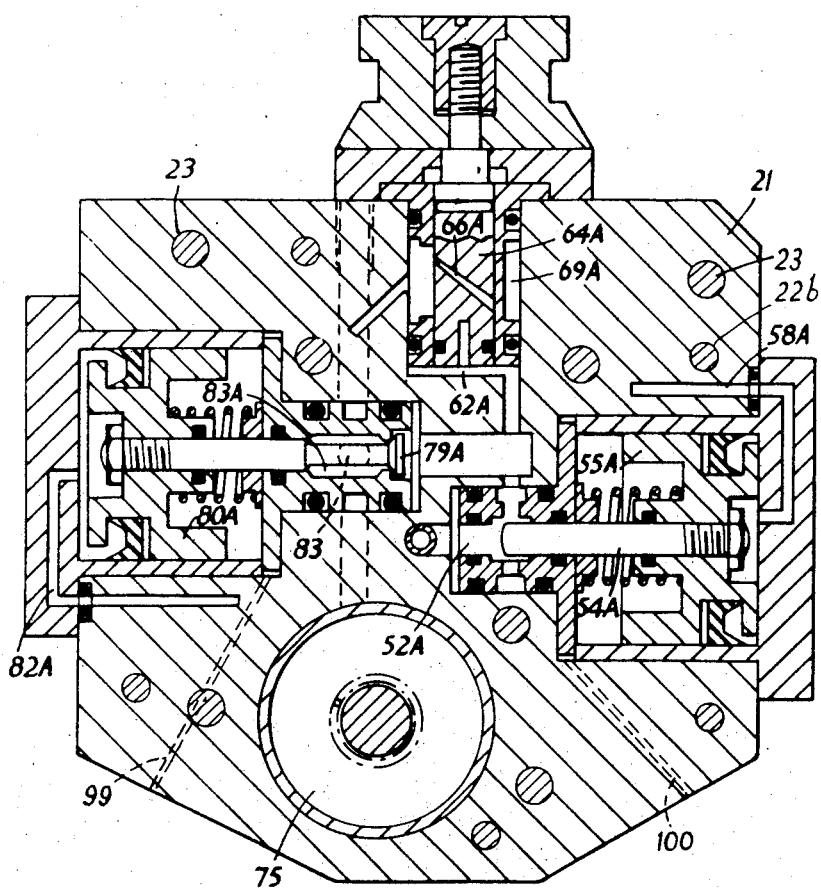
FIG. 3 is a sectional view on the plane 3—3 on FIG. 1.

The cylinder 10 is fixed at its rear end in a valve block 20 which is one of three viz. 20, 21, 22. Blocks 20, 21 are fixed together in line by bolts 23 (FIG. 3). This construction makes it possible to provide a larger diameter cylinder 10 with the aid of an adaptor plate at each end of the cylinder. The block 20 carries elastic packing rings 20A, 20B.

An end cap 22A is located against the block 22A and blocks 22, 22A are fixed to block 21 by bolts 22B (FIG. 4) so that blocks 22, 22A can be removed without disturbing blocks 20, 21.

Figure 2:
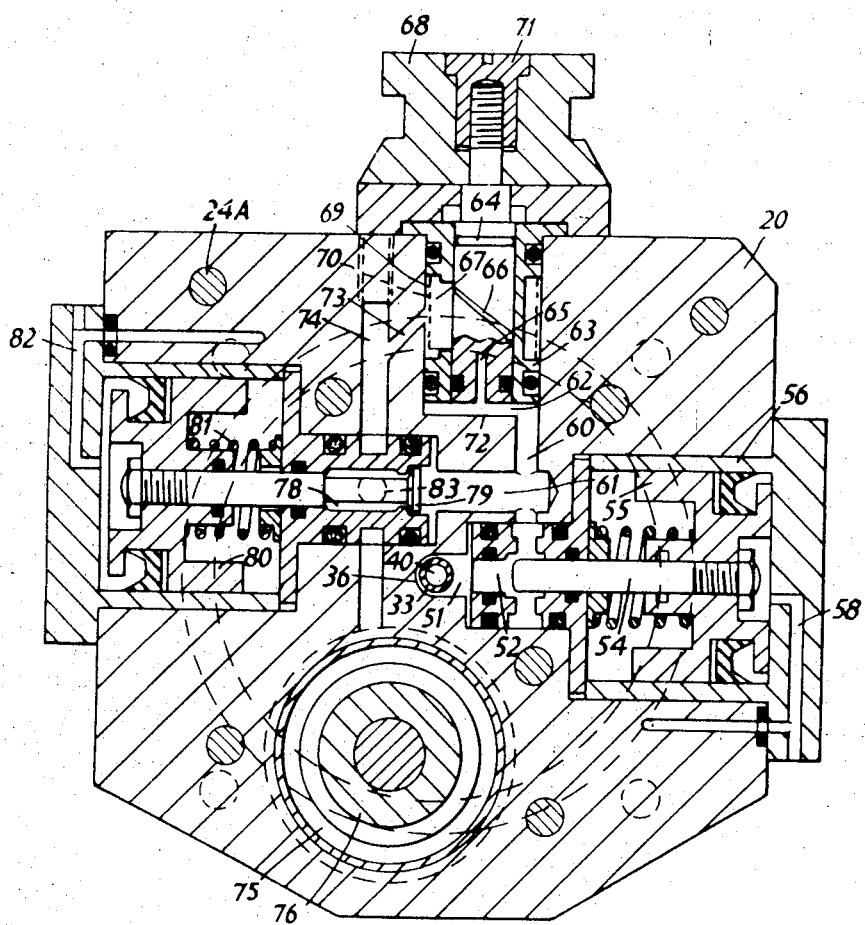
FIG. 2 is a sectional view on the plane 2—2 on FIG. 1.

The other (forward) end of the cylinder carries a square block 24 fixed to block 20 at its corners by bolts 24A (FIG. 2) and which in turn carries a bearing sleeve 25 that supports the tubular piston rod 26 which is co-axial with the cylinder 10 and is fixed at its inner end to the pneumatic piston 11 while its outer end projects out of the cylinder 10 and is closed by a block 27 which carries a mandrel or other tool carrying device 28.

The tubular piston rod 26 contains a fixed piston block 29 provided with an annular packing ring or seal 30.

The piston block 29 is fixed on the end of an intermediate tube 32 and an inner tube 33. The inner tube is co-axially disposed within the intermediate tube and the latter is disposed co-axially within the tubular piston rod 26. The diameters of the tubes are such that a channel 35 is provided between the intermediate tube and the tubular piston rod 26 and a channel 36 is provided between the inner tube 33 and the intermediate tube 32. A duct 37 provides communication between the channels 35, 36.

The inner tube extends at one end through the block 29 so that a channel 40 which is the interior of the inner tube 33 communicates with a space 41 on the opposite side of the block 29 to the channel 35.

Air under pressure is supplied via two valves 43, 44 in the end valve block 22 to a duct 45 leading to one side of the piston 11 and to a duct 46 leading by pipe 47 and duct 48 to the other end of the piston. The valves 43, 44 are supplied alternately with compressed air from another valve (not shown) which is reversed automatically or by hand.

The end of the tube 32 remote from the tool carrier 28 extends out of the piston rod 26 and is surrounded by two packing rings 26A, 26B in the annuli 12, 14. The tube 32 is fixed in the first valve block 20 and its interior is continued in this valve block as a drilling 50. Within this drilling extends the inner tube 33 into the second valve block 21. The valve blocks 20, 21 carry elastic packing rings 8, 9 around the tube 32 at or adjacent to the contacting faces of the blocks.

The channel 36 communicates by a bore 51 (FIG. 2) with a valve chamber 52 which can be closed by a valve member 54 by piston 55 in a cylinder 56 operated in the opening direction by spring 57 and in the closing direction by air pressure admitted through a duct 58.

The valve chamber 52 communicates with a pair of bores 60, 61 which connect with each other. The bore 60 leads to a valve chamber 62 which contains an annular valve block 63 in which is a rotatably adjustable valve member 64. Block 63 and member 64 form a metering valve to control the flow of liquid. The member 64 has a bore 65 communicating with the chamber 62 and this bore 65 communicates with a spiral groove 66 cut in its outer cylindrical surface. The groove 66 is of diminishing cross-sectional size i.e. it tapers and it communicates with a slot 67 in the wall of the valve block 63. Between the valve block 63 and the valve chamber wall is an annular space 69 containing an annular filter 70. The slot 67 is cut at a small angle e.g., 5°–10° to the axis of the valve block and by rotatably adjusting the valve member 64 any part of the spiral groove 66 can be brought into direct communication with the slot 67 so as to vary the minimum cross-sectional size of the channel through which the hydraulic fluid flows. A circular disc filter (not shown) may be provided in the space 72 at the bottom of the chamber 62.

A knob 68 is attached to the valve member by nut 71 so that it can be adjusted.

A duct 73 connects the space 69 with a bore 74 which leads to a reservoir 75 in which hydraulic fluid is held under pressure by a spring pressed piston 76. This reservoir 75 is formed as a bore located below the axis of the piston 11 and having its axis parallel to the axis of the piston 11. This bore is formed partly in each of the three valve blocks 20, 21, 22. The piston 76 carries a piston rod 77 which projects out of the end of the end valve block 22 so as to serve as an indication of too little oil is contained in the bore 75 e.g., if oil is lost by leakage. This reservoir 75 is adequate for a variety of cylinders 10 providing different lengths of piston strokes.

The bore 61 leads to a valve chamber 78 which can be closed by a valve member 79 that is operated by a piston 80 which is actuated in the closing direction by a spring 81 and in the opening direction by air applied to the piston through ducts 82. The valve chamber 78 communicates via a cross-duct 83 with the bore 74 that leads to the reservoir. Valve 78, 79 serves as a by-pass valve to by-pass the metering valve 63.

The valve in the block 20 is used for controlling advance of the tool. The valve 63A—69A in the block 21 is substantially identical with the valve 63, 69 in block 20 and need not therefore be again described. The bore 61 of block 20 is connected with the corresponding bore 61A of block 21 by the cross-duct 83. Some of the parts in block 21 are marked with the same numbers as the corresponding parts in block 20 with the addition of the letter A.

Figure 4:
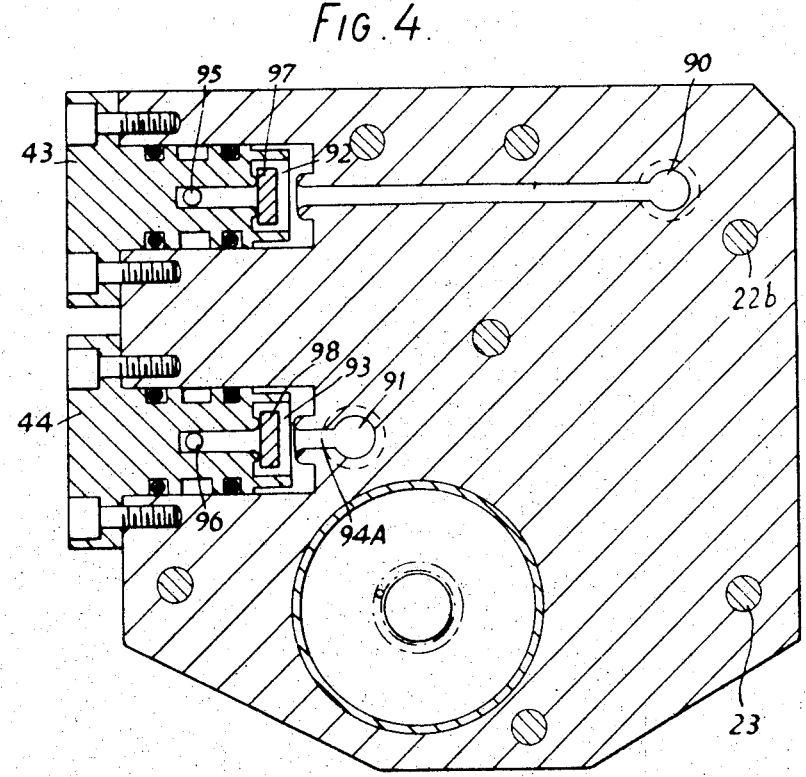
FIG. 4 is a sectional view on the plane 4—4 on FIG. 1.

Thus air is supplied alternately to ports 90, 91 FIG. 4, in valves 43, 44 direct to the opposite ends of piston 11 and valves 43, 44 have ports 92, 93 leading via ducts 94, 94A to the ports 82, 82A to operated the by-pass valve members 79, 79A. The valves 43, 44 also have ports 95, 96 through which compressed air signals can be supplied by a signal control valve (not shown) to open communication between ports 95, 96 and ports 92, 93 whereby compressed air can be supplied to the valve 79 or 79A which up to that moment is not open and open it so that both valves 79, 79A will then be open simultaneously to by pass the metering valve and achieve fast advance or return. The valves 43, 44 have movable valve discs 97, 98 of plastics material. Oil and air escape grooves 99, 100 (FIG. 3) are provided in the rear faces of blocks 20, 21 to ensure that air will not leak into the oil system and oil will not leak into the air system.

In operation compressed air is directed through orifice 91, FIG. 4 to duct 45 and enters the cylinder 10 and forces the piston 11 FIG. 1 forward. At the same time disc 98 FIG. 4, is forced to the left so closing the port 96 from compressed air, but allowing it to pass through orifice 93 and enters port 82A FIG. 3, and forces the piston 80A forward thereby opening valve member 79A which allows free passage of oil through this valve to both the reservoir 75 and oilways 61A through tube 33 to the cavity 41 FIG. 1 at the front end of hydraulic piston 29. As piston 11 advances the channel 35 is reduced in size since one end of this channel is formed by the fixed piston block 29 while the other end is formed by the moving piston 11. The oil from channel 35 is forced through duct 37, channel 36, and through 51, 52, 60, 62, 65, 66, 67, 69, 73 back to the reservoir 75 and through 83, 61A, 52A and 40 to the other end 41 of the tubular piston rod 26. At this time valve 79 is closed and 79A is open and valve 54A is not entered in the chamber 52A of the return valve in block 21 (i.e., 52A is open). Oil then returns via 52A, 40 to the left hand (41) of the cylinder 26. If at a certain point of advance, the valve 79 is opened the oil can pass through 61 to 83 instead of passing through the metering valve 64 and a fast advance is achieved. This is effected by applying compressed air to orifice 95 FIG. 4, which forces diaphragm 97 to the right so closing airway 94. The compressed air then passes into port 92 into port 82 to piston 80 which in turn forces valve member 79 forward so opening chamber 78 to chamber 61 FIG. 2, and common duct 83. This action will bypass metering valve 64 thus allowing unrestricted oil flow. Conversely if valve 79 is closed a slow advance is achieved the rate dependent on the adjustment of the valve 64. Complete stoppage in the forward direction, for positioning purposes, is achieved by applying compressed air to duct 58, FIG. 2, so forcing piston 55 forward thereby closing off bore 61 from chamber 52 which will stop all oil flow through the metering valve 64 and halt the forward movement and lock the piston 11 against further movement.

For reversing the action, the air supply is reversed compressed air is fed to port 90 in valve 44, FIG. 4, which feeds air via duct 46 and pipe 47 to the other end of the cylinder 10. At the same time the disc 97 is forced to the left so closing port 95 from compressed air, but allowing it to pass through port 92 which in turn enters port 82 and forces piston 80 forward so opening the valve member 79 which allows free passage of oil through this valve to both the reservoir 75 and duct 83 through tube 32 to the space 35 at the piston rod end of the hydraulic piston 29. Hydraulic fluid from 41 is then forced back through channel 40 and through the return metering valve in 21 or if a fast return is required the valve 79A is opened to give free return passage of the fluid back through 36, 37 to the channel or space 35 on the inner side of the tubular piston rod.

Valve 79A can be opened by applying compressed air to duct 96 which forces disc 98 to the right so closing duct 94A. The compressed air then passes into duct 93 into port 82A to the piston 80A which in turn forces the valve member 79A forward to open 78A to 61A, 83 thereby by-passing the metering valve.

Thus for fast advance:
Valve 79 is open
Valve 54 is open
Valve 54A is open
Valve 79A is open
For slow advance:
Valve 79 is closed
Valve 54 is open
Valve 54A is open
Valve 79A is open
For slow return:
Valve 79 is open
Valve 54 is open
Valve 54A is open
Valve 79A is closed
For fast return:
Valve 79 is open
Valve 54 is open
Valve 54A is open
Valve 79A is open
For complete stop valves 54, 54A are closed.

The various valves can be controlled by any suitable system e.g., by mechanical or electrical trip devices operated by the tool carrier 27 or by an electronic preset plan or computer.

Stopping during advance.
Valve 79A/FIG. 3 open
Valve 79/FIG. 2 closed
Valve 54/FIG. 2 closed
Valve 54A/FIG. 3 open
Stopping during return.
Valve 79A/FIG. 3 closed
Valve 79/FIG. 2 open
Valve 54/FIG. 2 open
Valve 54A/FIG. 3 closed In the modified form of valve shown in FIGS. 7 and 8 the member 64 is movable linearly in the axial direction in the block 63. The block 63 has a radial hole 100 and the member 64 has a tapered groove 1—1 communicating with inlet bores 102. The member 64 can be moved against an adjustable stop 103 or successively against a series of stops on a turret to give an automatic progressive multispeed metering. The rotary valve could be operated similarly.

Figure 9:
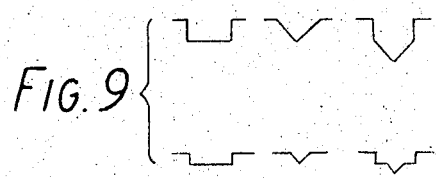
FIG. 9 is a diagram showing some of the various possible cross-sectional shapes for the metering channels of the valves.

FIG. 9 shows some of the many possible cross-sectional shapes of the groove.

Figure 5:
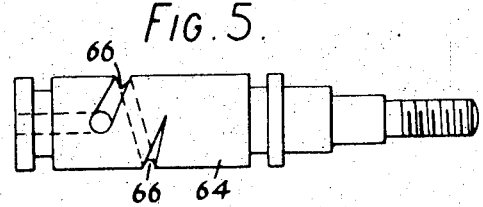
FIGS. 5 and 6 are views of parts of the valves shown in FIGS. 2 and 3.
Figure 6:
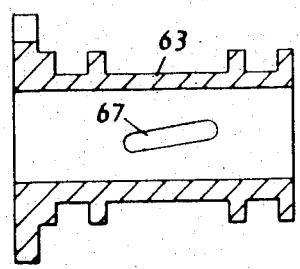
Figure 7:
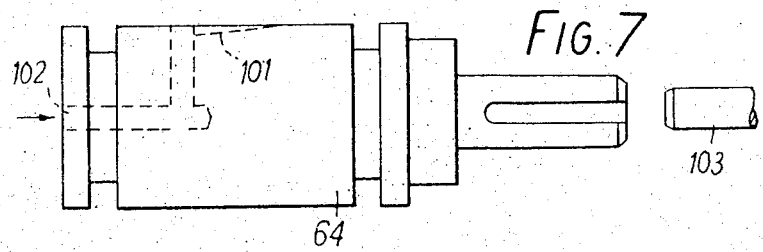
FIGS. 7 and 8 are views similar to FIGS. 5 and 6 but showing a modified form of valve.
Figure 8:
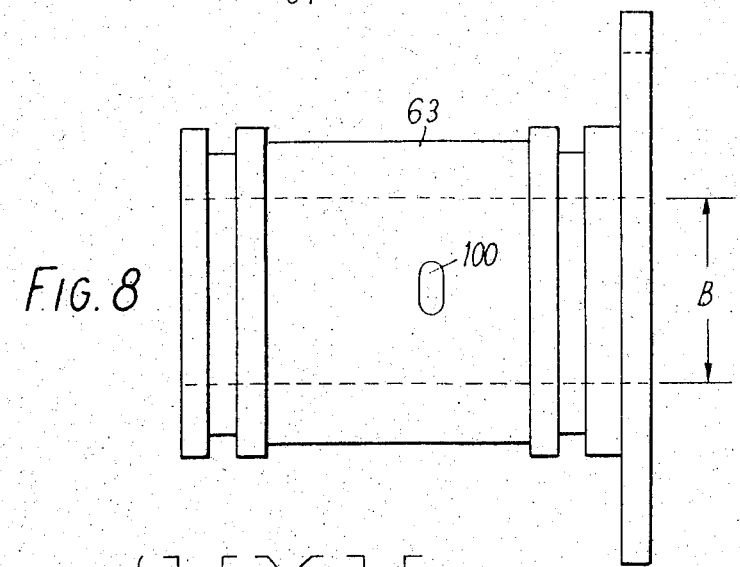

In the modified valve shown in FIGS. 7 and 8 the member 67 is movable linearly in the axial direction in the cylinder 63. The cylinder 63 has a radial hole 100 and the member 17 has a tapered groove 101 communicating with the inlet bores 102. The member 64 can be moved against an adjustable stop 103 or successively against a series of stops on a turret to give an automatic progressive multi-speed metering. The valve of FIGS. 5 and 6 could be similarly operated.

Figure 10:
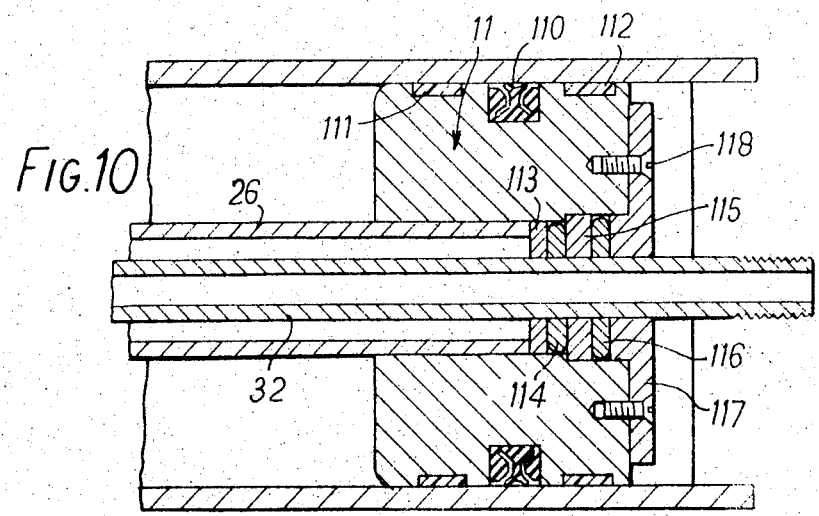
FIG. 10 is a sectional view of a modification.

FIG. 10 shows an alternative form of the piston 11. The parts 12, 13, 14 are made in a single piece which has a press fit on to the tube 26. The piston has a central groove to receive a packing ring 110 which is elastic so that it can be expanded over the piston and entered into its groove. The piston has two other grooves containing split nylon packing rings 11, 112. A metal ring 113 enters the bore in the piston and seats against the end of the tube 32 and against this is placed a packing ring 114, then a metal ring 115, followed by a packing ring 116 and a cover plate 117 attached by screws 118.

I claim:

1. Apparatus for moving a member at controlled speeds comprising a cylinder, a first piston in the cylinder, said cylinder and piston being double-acting, a tubular piston rod carrying said first piston and extending at its forward end out of the cylinder to actuate said member, a first valve block (20) fixed to the end of the cylinder remote from said extended end of the piston rod, a second valve block (21) secured against the rear of the first valve block, two tubes disposed within the tubular piston rod with one of said tubes surrounding the other thereby being an outer tube with respect to the other which is thereby an inner tube, the two tubes being spaced apart from each other and from the tubular piston rod radially to provide a first channel within the inner tube, a second channel between the two tubes, and a third channel between the outer tube and the tubular piston rod, the outer tube being fixed at one end to the first valve block, the inner tube being continued beyond said end of the outer tube to extend through the first valve block into the second valve block to which it is fixed, a passage (50) being provided between the extended end of the inner tube and the first valve block, a second piston carried by the forward end of the outer tube, said second piston sliding in the tubular piston rod, said inner tube passing through the second piston and opening into the piston rod at the outer end of said second piston, an opening (37) in the outer tube providing communication between the second and third channels on the inner side of said second piston, said first valve block containing a first metering valve and a first bypass valve for bypassing the first metering valve and a first blocking valve for blocking fluid flow, said second valve block containing a second metering valve and a second bypass valve for bypassing the second metering valve and a second blocking valve for blocking fluid flow, said metering valves each having an inlet and an outlet, means for adjusting said metering valves to vary the size of openings therethrough, first ducting in the first valve block connecting said passage (50) with the inlet side of the first metering valve and with the first bypass valve, second ducting (83) partly in one valve block and partly in the other and connecting the outlet of the first metering valve with the outlet of the second metering valve, third ducting connecting the first channel (40) with the inlet of the second metering valve, and means for actuating the two bypass valves independently of each other, whereby the speed of advance and withdrawal of the said member can be controlled; said first blocking valve (54) being arranged for blocking communication between said passage (50) and the inlet of the first metering valve, said second blocking valve (54A) being arranged for blocking communication between the interior of the inner tube (40) and the inlet to the second metering valve, and means for moving said blocking valves independently to their blocking and unblocking position.

2. Apparatus as claimed in claim 1 having a chamber formed partly in one valve block and partly in the other and parallel to but offset from said two tubes and serving to provide a reservoir in communication with the outlet sides of the metering valves, and to contain means for holding the liquid under pressure.

3. Apparatus as claimed in claim 1 wherein the double acting piston comprises a first annulus surrounding the piston rod, a split annulus bearing bush (13A) seating in a groove in the piston rod and engaging a groove in one face of the annulus at its inner periphery, a second annulus surrounding the piston rod and located against said face and a third annulus disposed against the second annulus remote from the first annulus, an exterior packing ring between the first and second annuli, an exterior packing ring between the second and third annuli, and interior packing rings surrounding the piston rod on opposite sides of the bearing bush located respectively in the first and second annuli, bolts fixing the three annuli together, packing (26A) surrounding the hollow piston rod between it and the second annulus, and packing (26B) surrounding the hollow piston rod between it and the third annulus.

4. Apparatus as claimed in claim 1 wherein each of the metering valves comprises a valve cylinder, a valve member in the valve cylinder, said valve member and valve cylinder being relatively movable, the valve member having a groove of gradually varying cross-sectional area formed in its periphery and cooperating with a hole in the cylinder, a channel being provided in the respective valve block leading to the groove.

5. Apparatus as claimed in claim 4, wherein said valve member groove is of gradually increasing depth and width.

6. Apparatus as claimed in claim 4 wherein the valve member groove is of gradually increasing depth and width and extends spirally around the valve member and the member is mounted for rotation in the valve cylinder.

7. Apparatus as claimed in claim 6 wherein the valve cylinder hole is a slot extending lengthwise of the cylinder at an angle to the axis of the cylinder.

* * * * *